Patented Sept. 17, 1940

2,214,782

UNITED STATES PATENT OFFICE 2,214,782

INSECTICIDE

Hans von Philipp, Leipzig, Germany, assignor to Fritz Schulz jun. Aktiengesellschaft, Leipzig, Germany No Drawing. Application August 2, 1937, Serial No. 157,063. In Germany August 2, 1936

10 Claims. (Cl. 167—22)

In the course of the exploration and examination of new insecticides, there was made the surprising discovery, that in general the insecticidal effect is very considerably increased, by adding to one or more insecticidal substances small quantities of one or more other insecticidal substances. As a remarkable matter of fact it has been found, that generally additions of a few per cent of an insecticidal substance—often only 0.5%—are sufficient to increase the efficacy of another insecticidal substance very considerably. In many cases the efficacy has even been multiplied.

Examples (1) A composition of 95% of paradichlorbenzene and 5% of hexachlorethane will kill moth-worms within 6 hours, whereas pure paradichlorbenzene, employed under quite the same conditions, will kill them only after 72–92 hours. By the addition of only 5% of hexachlorethane, the efficacy of which on moth-worms is far inferior to that of paradichlorbenzene, the insecticiding efficacy of the latter has been multiplied.

(2) One part of an insecticide of a specially great efficacy product "P" is mixed up with 99 parts of paradichlorbenzene. This composition will kill the moth-worms after 4–5 hours, whereas pure paradichlorbenzene, under just the same conditions, will kill them only after 72–92 hours, and the product "P" after 8 hours. By the addition of 1% of the insecticide "P" the efficacy of paradichlorbenzene has become almost 20 times stronger. (Product "P" is parachlorobromobenzene.)

(3) On examining the efficacy of a composition of 98% of hexachlorethane and 2% of an insecticide "M" on moths (butterflies), it was found that these butterflies were killed after 1½–2 hours. Hexachlorethane itself will kill the moths (butterflies) under the same conditions only after 24 hours, whereas the product "M" kills them after 1¼ hours. Thus, the effect obtained by the addition of 2% of the insecticide "M" means in this case a reduction of the necessary time to kill the moths to about one tenth of the time, which is necessary when using hexachlorethane only. (Product "M" is acetonechloroform.)

(4) It is surprising that a composition of 10% of the product "M" and 90% of paradichlorbenzene killed moth-worms after 6 hours, whereas paradichlorbenzene usually kills them only after 72–92 hours. In this case, by the addition of 10% of the product "M," the insecticidal efficacy of the paradichlorbenzene has been more than decupled.

(5) On examining the efficacy of a composition of 1.5% of the product "M" and 98.5% of paradichlorbenzene on moths (butterflies), it was found, that the moths were killed after 30 minutes instead of 4 hours, which means that the efficacy of paradichlorbenzene has been more than octupled.

(6) By the addition of 5% of the product "M" to 95% of hexachlorethane the insecticiding efficacy of the latter on moth-worms has been multiplied. The results of three experiments made in a correct manner and under quite the same conditions with four moth-worms each, have in all these cases shown, that this composition requires only 20 hours to kill the moth-worms, whereas hexachlorethane itself kills them only in the course of a fortnight.

(7) Three experiments made with a composition of 2% of thymol and 98% of paradichlorbenzene have in all cases given the result, that the moth-worms were killed after 16–20 hours instead of 72–92 hours, which is the case when using paradichlorbenzene only. This means a triplication and more of the original efficacy of paradichlorbenzene.

(8) A composition of 0.75% of thymol, 0.75% of the product "M" and 98.5% of paradichlorbenzene killed moths (butterflies) after 1.5 hours only, whereas paradichlorbenzene kills them after 4 hours. This fact has been proved by three experiments.

(9) Six experiments with 4 moths (butterflies) each and a composition of 1% of the product "P," 1% of the product "M" and 98% of paradichlorbenzene gave the following result: the moths were killed after one hour instead of 4 hours, which is the case when using pure paradichlorbenzene.

(10) Experiments with a composition of 1% of the product "P," 1% of the product "M" and 98% of paradichlorbenzene required a time of three hours only to kill the moth-worms instead of 72–92 hours, which means, that the insecticiding efficacy of the paradichlorbenzene has been increased by more than 20 times its original value.

My invention can be proved by a number of reports of the "Institut für landwirtschaftliche Zoologie" (Institution for Agricultural Zoology) of the University of Berlin.

The very important technical effect of my invention is due partly to the fact, that by the above described combination, which is characterized by an insignificant addition of one or more insecticidal substances to one or more other insecticidal substances, the efficacy is increased in such a degree, that it surpasses the efficacy of the single insecticidal substances used in this combination and partly to the fact, that by the addition of only insignificant quantities of a perhaps expensive insecticide of great efficacy—whereupon this invention is based—there will be given the possibility to produce insecticides of specially great efficacy on an economically favourable base (see for instance Examples 2, 3, 5, and 10).

As illustrated by the use of acetone chloroform in Examples 3, 4, 5, 6, 8, 9 and 10 given above, I find that small quantities of compounds of the group consisting of triple or higher chlorinated aliphatic alcohols, their esters and ethers, and analogous fatty aromatic alcohols, and their esters and ethers accomplish the desired result of increasing the efficacy of the resulting insecticide over the ordinary insecticide to which such compounds have been added. Also, as shown by Examples 2, 9 and 10 above, I find that small quantities of halogenated benzenes and their derivatives, as for example, paradichlorbenzene and parachlorbromobenzene may be used to greatly increase the efficacy of the selected base insecticide; or small quantities of one or more phenol substances and their derivatives, for example, thymol to paradichlorbenzene, and isothymol to monochlorbenzene and to orthodichlorbenzene; or small quantities of halogenated aliphatic compounds such as carbon tetrachloride and chloral hydrate; or small quantities of the group consisting of halogenated aromatic compounds such as naphthaline chloride, may be used.

Having thus described my invention, I claim:

1. The process of increasing the effectiveness of insecticides which consist essentially of chlorinated hydrocarbon compounds selected from the group consisting of the mono- and di-chlorbenzenes, which comprises activating the said insecticides by adding a relatively small percentage of a chlorinated aliphatic compound selected from the group consisting of hexachlorethane, acetone chloroform, and chloral hydrate.

2. The process of increasing the effectiveness of insecticides according to claim 1 in which the quantity of the chlorinated aliphatic compound added does not exceed about 5%.

3. The process of increasing the effectiveness of insecticides which consist mainly of chlorinated hydrocarbon compounds selected from the group consisting of the mono- and di-chlorbenzenes which comprises activating the said insecticides by the addition of a relatively small percentage of acetone chloroform.

4. The process of increasing the effectiveness of insecticides which consist mainly of chlorinated hydrocarbon compounds selected from the group consisting of the mono- and di-chlorbenzenes which comprises activating the said insecticides by the addition of a relatively small percentage of hexachlorethane.

5. The process of increasing the effectiveness of insecticides according to claim 4, in which the chlorinated hydrocarbon is paradichlorbenzene and the hexachlorethane is added in the proportion of not more than about 5%.

6. An insecticide which consists essentially of chlorinated hydrocarbon compounds selected from the group consisting of the mono- and di-chlorbenzenes and which contains, as an activating ingredient, a relatively small percentage of a chlorinated aliphatic compound selected from the group consisting of hexachlorethane, acetone chloroform, and chloral hydrate.

7. An insecticide which consists essentially of chlorinated hydrocarbon compounds selected from the group consisting of the mono- and di-chlorbenzenes and which contains, as an activating ingredient, not more than about 5% of a chlorinated aliphatic compound selected from the group consisting of hexachlorethane, acetone chloroform, and chloral hydrate.

8. An insecticide which consists essentially of chlorinated hydrocarbon compounds selected from the group consisting of the mono- and di-chlorbenzenes and which contains, as an activating ingredient, a relatively small percentage of acetone chloroform.

9. An insecticide which consists essentially of chlorinated hydrocarbon compounds selected from the group consisting of the mono- and di-chlorbenzenes and which contains, as an activating ingredient, a relatively small percentage of hexachlorethane.

10. An insecticide which consists essentially of paradichlorbenzene and which contains, as an activating ingredient, not more than about 5% of hexachlorethane.

HANS von PHILIPP.